United States Patent
Li et al.

(10) Patent No.: US 11,749,022 B2
(45) Date of Patent: Sep. 5, 2023

(54) METHOD AND SYSTEM OF DEEP FACE RECOGNITION FOR FISHEYE IMAGE

(71) Applicant: NATIONAL TAIWAN UNIVERSITY, Taipei (TW)

(72) Inventors: Yi-Hsin Li, Taipei (TW); I-Chan Lo, Taipei (TW); Hong-Ming Chen, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 57 days.

(21) Appl. No.: 17/241,150

(22) Filed: Apr. 27, 2021

(65) Prior Publication Data

US 2022/0292279 A1    Sep. 15, 2022

(30) Foreign Application Priority Data

Mar. 11, 2021 (TW) ................... 110108622

(51) Int. Cl.
*G06V 40/16* (2022.01)
*G06N 3/045* (2023.01)

(52) U.S. Cl.
CPC ........... *G06V 40/172* (2022.01); *G06N 3/045* (2023.01)

(58) Field of Classification Search
CPC ............................ G06V 40/172; G06N 3/0454
See application file for complete search history.

(56) References Cited

U.S. PATENT DOCUMENTS

2019/0236416 A1    8/2019  Wang et al.
2021/0312203 A1*  10/2021  Patzwaldt ............ G05D 1/0221

FOREIGN PATENT DOCUMENTS

| CN | 102393951 B  | 10/2014 |
| CN | 110197466 A  | 9/2019  |
| TW | I693560 B    | 5/2020  |

OTHER PUBLICATIONS

Lee et al, "Correction of Barrel Distortion in Fisheye Lens Images Using Image-Based Estimation of Distortion Parameters", 2019 (Year: 2019).*
Zhang et al, "Dual-discriminator GAN: a GAN way of profile face recognition", 2020, (Year: 2020).*

* cited by examiner

*Primary Examiner* — Ruiping Li
(74) *Attorney, Agent, or Firm* — Li & Cai Intellectual Property (USA) Office

(57) ABSTRACT

A method and a system of deep face recognition for a fisheye image are provided. The method includes determining a category corresponding to an input image, performing an image rectification according to the category corresponding to the input image to generate a restored image, and performing a face recognition on the restored image to determine an identity corresponding to the input image. The category correlates to a radial distance corresponding to the input image.

10 Claims, 9 Drawing Sheets

METHOD AND SYSTEM OF DEEP FACE RECOGNITION FOR FISHEYE IMAGE

CROSS-REFERENCE TO RELATED PATENT APPLICATION

This application claims the benefit of priority to Taiwan Patent Application No. 110108622, filed on Mar. 11, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method and a system for deep face recognition, and more particularly to a method and a system for deep face recognition for a fisheye image.

BACKGROUND OF THE DISCLOSURE

Facial recognition is widely used in various applications, including home security, video surveillance, personalized advertisements, law enforcement, banking transactions, intelligent transportation, healthcare, etc. With the development of deep learning, accuracy of a face recognition for rectilinear images has been greatly improved. However, more and more images for face recognition nowadays are not in the form of rectilinear images. For example, the images can come from a panoramic camera with two fisheye lenses arranged in a back-to-back manner. Such cameras are subject to fisheye distortion, which often affects the accuracy of the face recognition. How to make the face recognition work for both rectilinear images and fisheye images has become one of the important issues in the related field.

SUMMARY OF THE DISCLOSURE

Targeting the above-referenced technical issue, the present disclosure provides a method and a system for deep face recognition for a fisheye image.

In one aspect, the present disclosure provides a deep face recognition method for fisheye images. The method is used in a deep face recognition system. The method includes: determining a category corresponding to an input image, in which the category correlates to a radial distance of the input image, performing an image rectification according to the category of the input image to generate a restored image, and performing a face recognition on the restored image to determine an identity corresponding to the input image.

In another aspect, the present disclosure provides a deep face recognition system for fisheye images. The deep face recognition system includes a classification module, a restoration module, a feature extraction module, and a feature matching module. The classification module is used to classify an input image and determine a category corresponding to the input image to generate a classification signal. The category correlates to a radial distance corresponding to the input image. The restoration module is coupled to the classification module and used to restore the input image according to the classification signal to generate the restored image. The feature extraction module is coupled to the restoration module and used to extract a feature of the restored image. The feature matching module is coupled to the feature extraction module and used to determine an identity corresponding to the input image according to the feature that is extracted.

Therefore, by virtue of "determining the category corresponding to the input image, performing the image rectification according to the category of the input image to generate the restored image, and performing the face recognition on the restored image to determine the identity corresponding to the input image", accuracy of a face recognition of the fisheye image is improved by the method and the system provided by the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
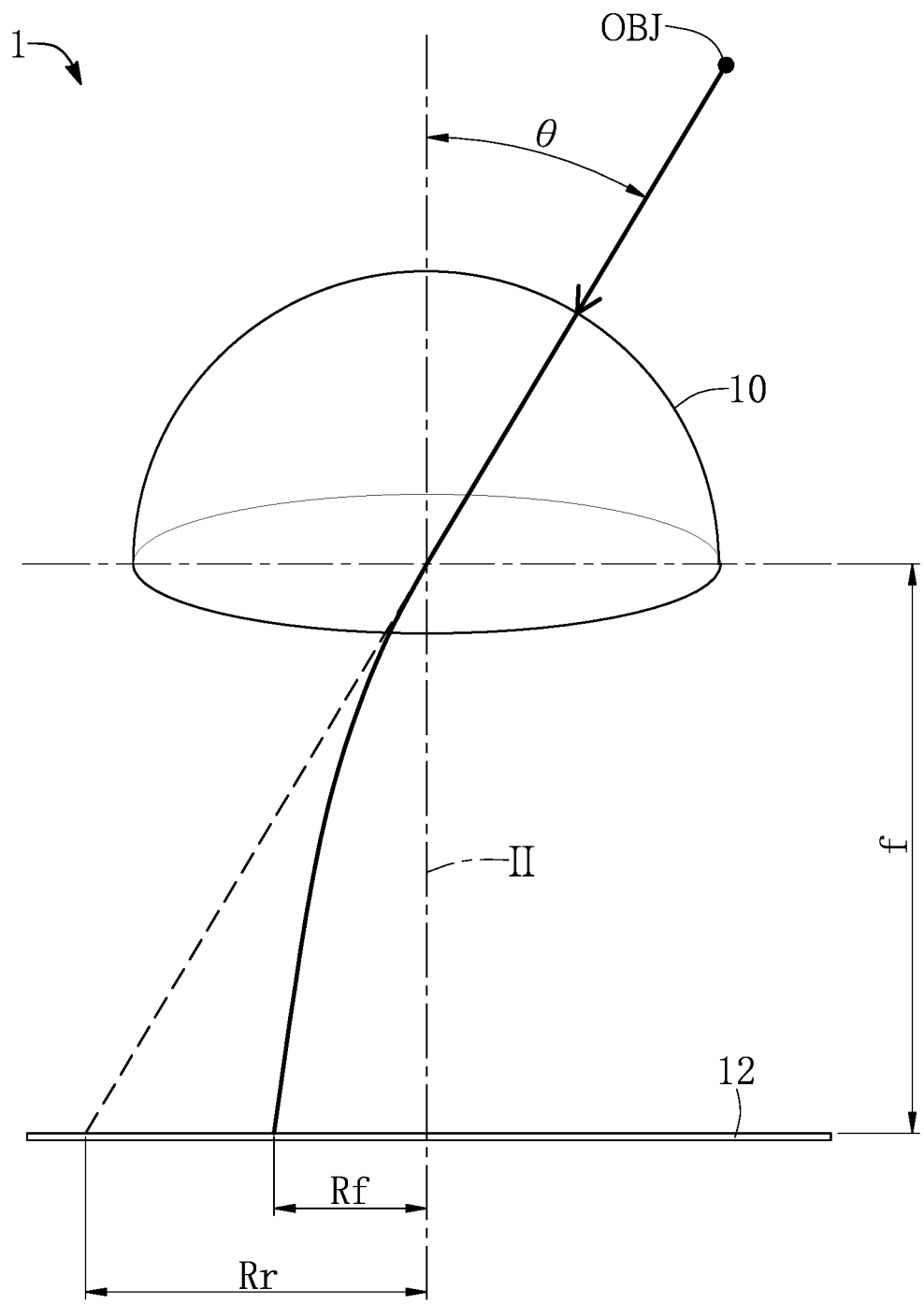
FIG. 1 is a schematic view of an imaging system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals, or the like, which are for distinguishing one component/signal from another one only, and are not intended to, nor should be construed to impose any substantive limitations on the components, signals, or the like.

First Embodiment

FIG. 1 is a schematic view of an imaging system 1 according to a first embodiment of the present disclosure. In the imaging system 1, a distance (i.e., a focal length) between an optical center of a fisheye lens 10 and an image plane 12 is represented as f, and an angle (i.e., an incident angle) between an optical axis II of the fisheye lens 10 and an incident light originating from an object OBJ is represented as θ. Due to an isotropic property of the fisheye lens 10 for a distorted image, only a radial distance between a projection point of the incident light on the image plane 12 and the optical axis II is concerned.

An equidistance projection can be used to characterize a formation of a fisheye image. A path of the incident light bending after passing through the fisheye lens 10 toward the image plane 12 is represented as a solid line, and the radial distance between the projection point of the incident light on the image plane 12 and the optical axis II is represented as Rf. The radial distance Rf in the equidistance projection can be expressed by the following equation (1).

$$Rf = f\theta \qquad (1).$$

A perspective projection can be used to characterize a formation of a rectilinear image. A path of the incident light traveling straight after passing through a pinhole toward the image plane 12 is represented as a dashed line, and the radial distance between the projection point of the incident light on the image plane 12 and the optical axis II is represented as Rr. The radial distance Rr in the perspective projection can be expressed by the following equation (2).

$$Rr = f \cdot \tan\theta \qquad (2).$$

Figure 2:
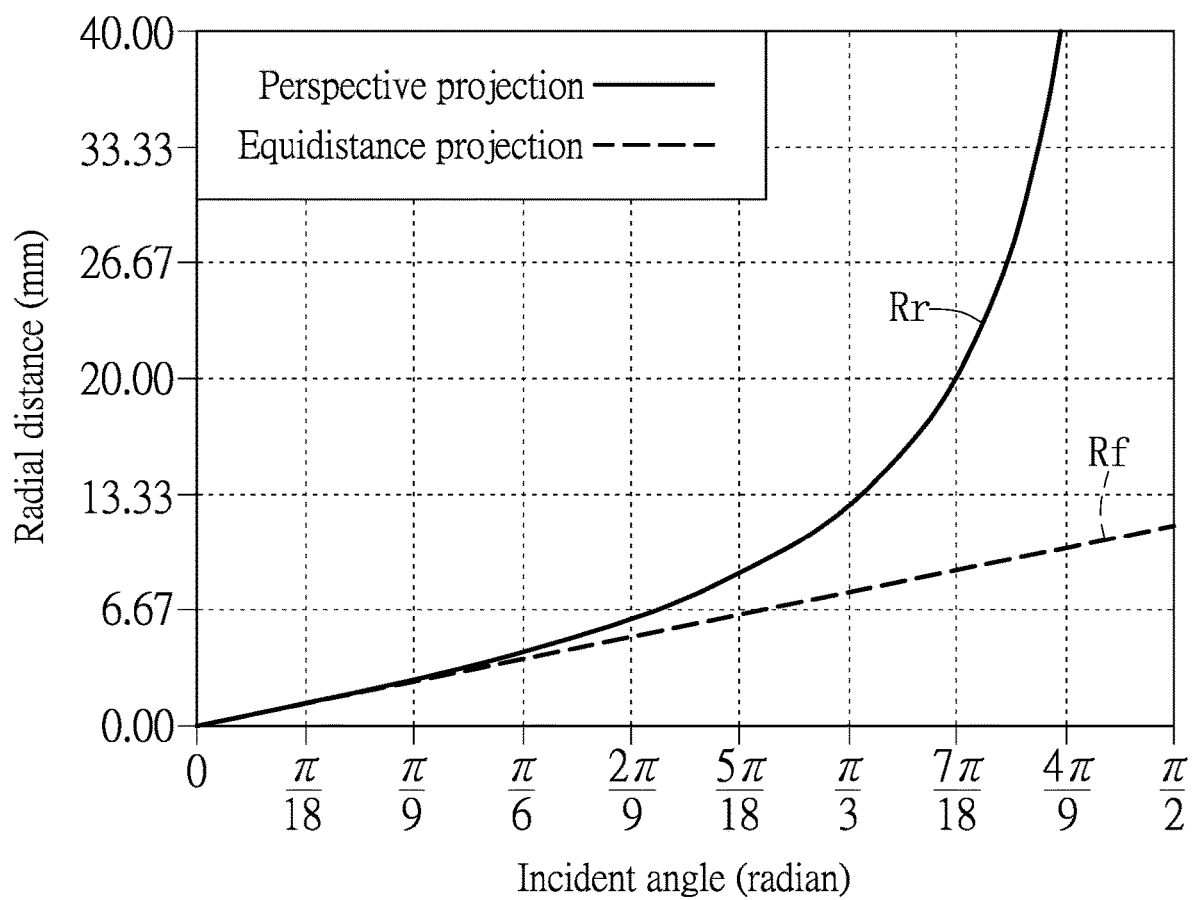
FIG. 2 is a schematic curve diagram illustrating an equidistant projection and a perspective projection as a function of incident angle according to the first embodiment of the present disclosure.

FIG. 2 is a schematic curve diagram illustrating an equidistant projection and a perspective projection as a function of incident angle (expressed in radians) according to the first embodiment of the present disclosure. In FIG. 2, for a given focal length f of 7.3 mm, the radial distance Rr versus the incident angle in the perspective projection is represented as the solid line, while the radial distance Rf versus the incident angle in the equidistant projection model is represented as the dashed line. It can be observed in FIG. 2 that the radial distance Rr of the perspective projection is a good approximation of the radial Rf of the equidistance projection when the incident angle is less than a specific angle (e.g., 2π/9 radians). The fisheye image can be approximated as a rectilinear image so that an image rectification can be omitted for the image in this zone. Accordingly, unnecessary computational resources and operation time can be avoided without compromising accuracy of a face recognition in the present disclosure. On the other hand, when the incident angle is greater than the specific angle, a difference between the radial distance Rr in the perspective projection and the radial distance Rf in the equidistance projection increases exponentially with an increase of the incident angle, and accordingly, a distortion of the fisheye image increases exponentially. Therefore, the image rectification for the image in this zone is required to improve the accuracy of the face recognition. In addition, when the incident angle approaches that of π/2 radians, the difference between the radial distance Rr in the perspective projection and the radial distance Rf in the equidistance projection increases dramatically, and the distortion of the fisheye image becomes more significant. Therefore, a further image rectification for the image in this zone is required.

Figure 3:
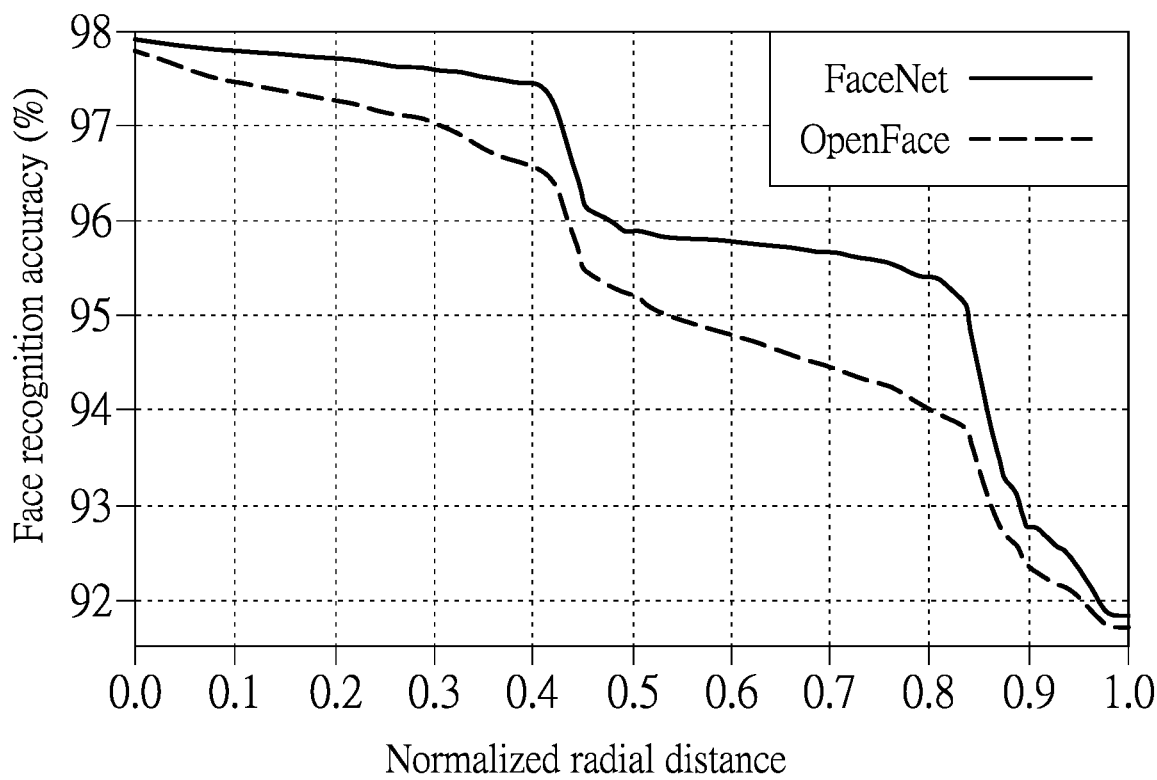
FIG. 3 is a schematic curve diagram illustrating average accuracy of a face recognition versus a normalized radial distance according to the first embodiment of the present disclosure.

FIG. 3 is a schematic curve diagram illustrating average accuracy of a face recognition versus a normalized radial distance according to the first embodiment of the present disclosure. In FIG. 3, a FaceNet® face recognition system is used to perform the face recognition on a plurality of fisheye images, and a corresponding curve is represented as the solid line. In addition, an OpenFace® face recognition system is used to perform the face recognition on the plurality of fisheye images, and a corresponding curve is represented as the dashed line. Each of the FaceNet® face recognition system and the OpenFace® face recognition system is a deep convolutional neural network (DCNN)-based face recognition system.

It can be observed from FIG. 3 that the average accuracy of the face recognition of each of the FaceNet® face recognition system and the OpenFace® face recognition system decreases as the radial distance increases. In particular, the average accuracy of the face recognition has two abrupt drops, one approximately at the normalized radial distance 0.4 (corresponding to an incident angle of 40 degrees), and another one approximately at the normalized radial distance 0.9 (corresponding to an incident angle of 90 degrees). Accordingly, the two abrupt drops divide the normalized radial distance into three zones, where the fisheye image in each zone has a different degree of distortion, resulting in different accuracy of the face recognition. It should be noted that different fisheye lenses may have different abrupt drops. In FIG. 3, the accuracy of the face recognition of the fisheye image is acceptable when the normalized radial distance is in a first zone (e.g., the angle of 0 to 40 degrees), thus the image rectification can be omitted. The accuracy of the face recognition of the fisheye image is poor when the normalized radial distance is in a second zone (e.g., the angle of 41 to 90 degrees), so that a first image rectification is required. The accuracy of the face recognition of the fisheye image is extremely poor when the normalized radial distance is in a third zone (e.g., the angle of 90 degrees or more), and a second image rectification is required. Accordingly, in the present disclosure, a corresponding image rectification is performed on a fisheye image according to its normalized radial position so that the accuracy of the face recognition of the fisheye images in the overall normalized radial distance range is improved. In addition, the present disclosure does not limit a zoning of the normalized radial distance. A user can classify the range of the normalized radial distance into different zones according to a type of lens used or a specification of an application. The image rectification for the image is performed as long as the accuracy of the face recognition of the fisheye image is within a predetermined range.

Figure 4:
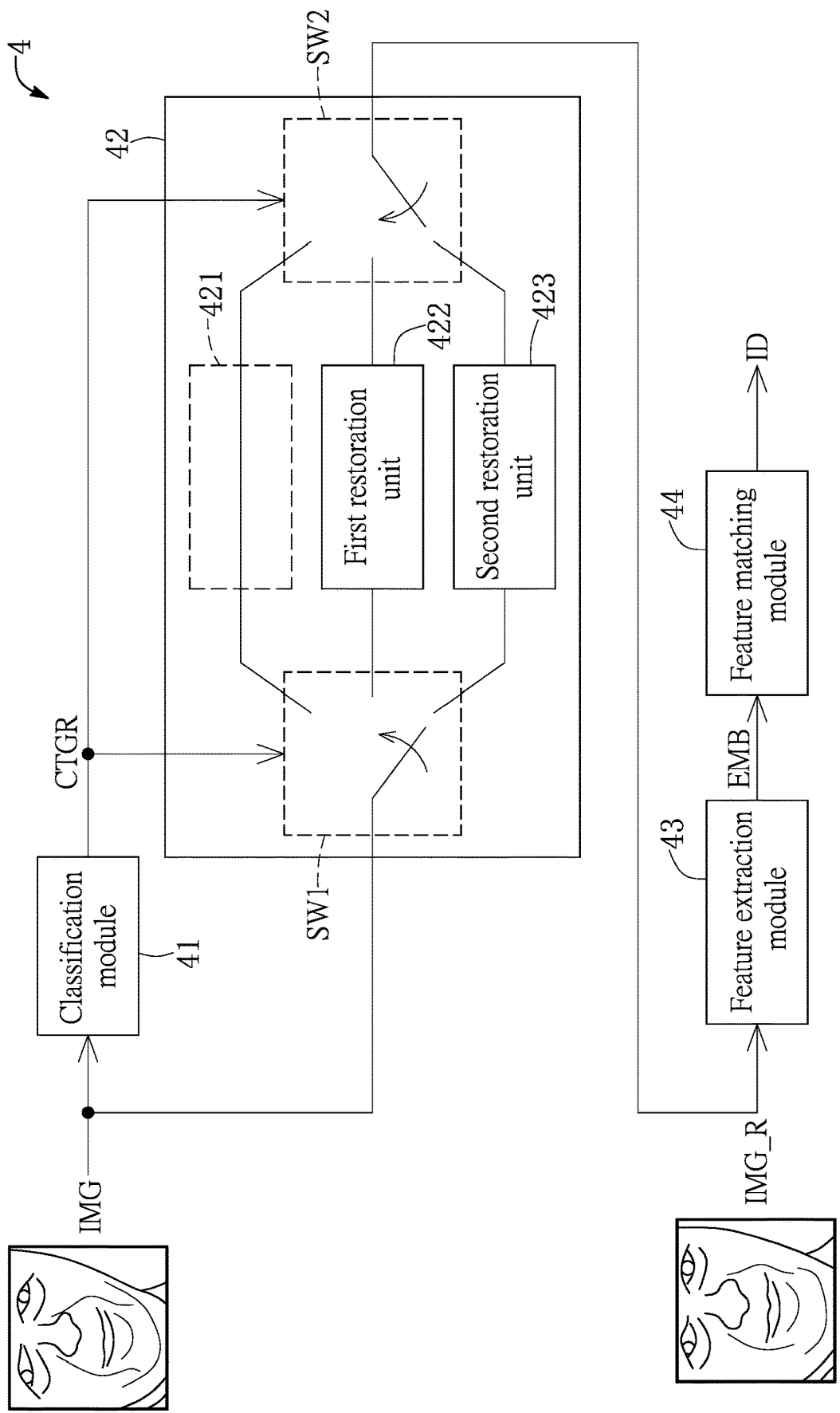
FIG. 4 is a functional block diagram of a face recognition system according to the first embodiment of the present disclosure.

FIG. 4 is a functional block diagram of a face recognition system 4 according to the first embodiment of the present disclosure. The face recognition system 4 includes a classification module 41, a restoration module 42, a feature extraction module 43, and a feature matching module 44.

The classification module 41 and the restoration module 42 are used to perform the image rectification on an input image IMG, so as to generate a restored image IMG_R. The input image IMG is a distorted image or a rectilinear image, and the restored image IMG_R is the rectilinear image. Specifically speaking, the classification module 41 takes the input image IMG and determines a category corresponding to the input image IMG, so as to generate a classification signal CTGR and send it to the restoration module 42. The restoration module 42 is coupled to the classification module 41 and used to restore the input image IMG according to the classification signal CTGR, so as to generate the restored image IMG_R.

The restoration module 42 includes a first switch SW1, a second switch SW2, a follower 421, and a plurality of restoration units, such as a first restoration unit 422 and a second restoration unit 423. The first switch SW1 is coupled between the classification module 41, the follower 421, the first restoration unit 422, and the second restoration unit 423. The first switch SW1 is used to connect the input image IMG to the one of the follower 421, the first restoration unit 422, and the second restoration unit 423 corresponding to the category of the input image IMG, according to the category information carried by the classification signal CTGR. The second switch SW2 is coupled between the follower 421, the first restoration unit 422, the second restoration unit 423, and the feature extraction module 43. The second switch SW2 is used to connect the restored image IMG_R generated by one of the follower 421, the first restoration unit 422, and the second restoration unit 423 to the feature extraction module 43, according to the category information carried by the classification signal CTGR. According to an exemplary example in FIG. 3, the category of the input image IMG correlates to the normalized radial distance, and the normalized radial distance correlates to the accuracy of the face recognition of the input image IMG. The input image IMG can be classified into one of at least two categories, one is the rectilinear image on which no image processing is performed and another one is the distorted image on which the image rectification is performed. Furthermore, according to the degree of the distortion, the input image IMG can be classified into three categories, one is the rectilinear image on which no image processing is performed, a second one is the distorted image on which the first image rectification is performed, and a third one is the distorted image on which the second image rectification is performed. In one embodiment, the above-mentioned three categories correspond to the input image with the normalized radial distance in the first zone (the angle of 0 to 40 degrees), the second zone (the angle of 41 to 90 degrees), and the third zone (the angle of 90 degrees or more). Accordingly, the follower 421 does not perform any image processing on the input image if it is located in the first zone, so that unnecessary computational resource and operation time can be avoided. The first restoration unit 422 is used to perform the first image rectification on the input image if it is located in the second zone, and the second restoration unit 423 is used to perform the second image rectification on the input image if it located in the third zone. In another embodiment, a person having ordinary skill in the art can determine a definition and a quantity of the category according to particular implementations but is not limited to the exemplary example of FIG. 3 of the present disclosure. For example, the definition and the quantity of the category can be determined according to at least one of a magnitude and a change amount of the accuracy of the face recognition. In one embodiment, the follower 421 can be a transmission channel or a conducting wire.

The feature extraction module 43 and the feature matching module 44 are used to perform the face recognition on the restored image IMG_R, so as to determine an identity ID corresponding to the input image IMG. Specifically speaking, the feature extraction module 43 is coupled to the restoration module 42 and is used to extract a feature EMB of the restored image IMG_R. The feature matching module 44 is coupled to the feature extraction module 43 and is used to determine the identity ID corresponding to the input image IMG according to the feature EMB. For example, the feature matching module 44 searches for the identity ID that matches with the feature EMB in a database of identities (not shown in FIG. 4). When the feature matching module 44 finds the identity ID that matches with the feature EMB, the identity ID corresponding to the input image IMG is determined. In contrast, when the feature matching module 44 does not find the identity ID that matches with the feature EMB, no matching signal is outputted or no output is generated.

In brief, the face recognition system 4 of the present disclosure can classify the input image IMG, and then perform the image rectification on the input images IMG of different categories to generate the restored images IMG_R. Subsequently, the face recognition system 4 of the present disclosure performs the face recognition on the restored images IMG_R, so that the accuracy of the face recognition is improved.

Figure 5:
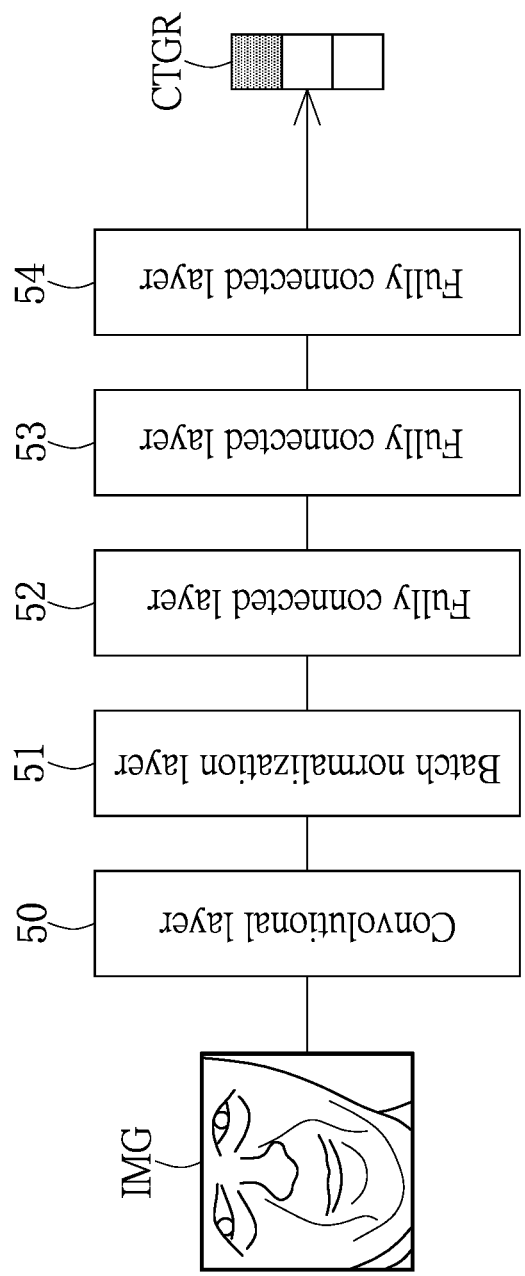
FIG. 5 is a schematic view of a network architecture of a classification module according to the first embodiment of the present disclosure.

FIG. 5 is a schematic view of a network architecture of a classification module 41 according to the first embodiment of the present disclosure. The classification module 41 can be a deep convolutional neural network and includes a convolutional layer 50, a batch normalization layer 51, and fully connected layers 52 to 54. The network architecture of the classification module 41 is provided in Table 1.

TABLE 1

| Classification module | | | | |
|---|---|---|---|---|
| Layer | Input size | Output size | Kernel size, Stride size | Quantity of Parameters |
| Convolutional layer 50 | 96 × 96 × 3 | 32 × 32 × 16 | 3 × 3 × 16, 3 | 0.4K |
| Batch normalization layer 51 | 32 × 32 × 16 | 32 × 32 × 16 | | 0.05K |

TABLE 1-continued

| | | Classification module | | |
|---|---|---|---|---|
| Layer | Input size | Output size | Kernel size, Stride size | Quantity of Parameters |
| Fully connected layer 52 | 32 × 32 × 16 | 1 × 1 × 128 | | 2M |
| Fully connected layer 53 | 1 × 1 × 128 | 1 × 1 × 64 | | 8K |
| Fully connected layer 54 | 1 × 1 × 64 | 1 × 1 × 3 | | 0.2K |
| Total | | | | 2.09M |

The size of input, output, and kernel is denoted by rows × columns × quantity of filters.

In one embodiment, the classification signal CTGR is a 1-by-N one-hot vector, that is, only one of N vector elements has a value of 1, and each of a rest of (N−1) vector elements has a value of 0, where N is the quantity of the categories. The one-hot vector can be used as a label for the category corresponding to the input image IMG. In the exemplary example of FIG. 3, the classification signal CTGR is a 1 by 3 one-hot vector. When the input image IMG corresponds to the normalized radial distance of 0 to 40 degrees, the classification module 41 generates the classification signal with a vector value of (0, 0, 1). When the input image IMG corresponds to the normalized radial distance of 41 to 90 degrees, the classification module 41 generates the classification signal with the vector value of (0, 1, 0). When the input image IMG corresponds to the normalized radial distance greater than 90 degrees, the classification module 41 generates the classification signal with the vector value of (1, 0, 0). In one embodiment, the input image IMG is scaled to 96×96 pixel$^2$, but it is not limited thereto.

Figure 6:
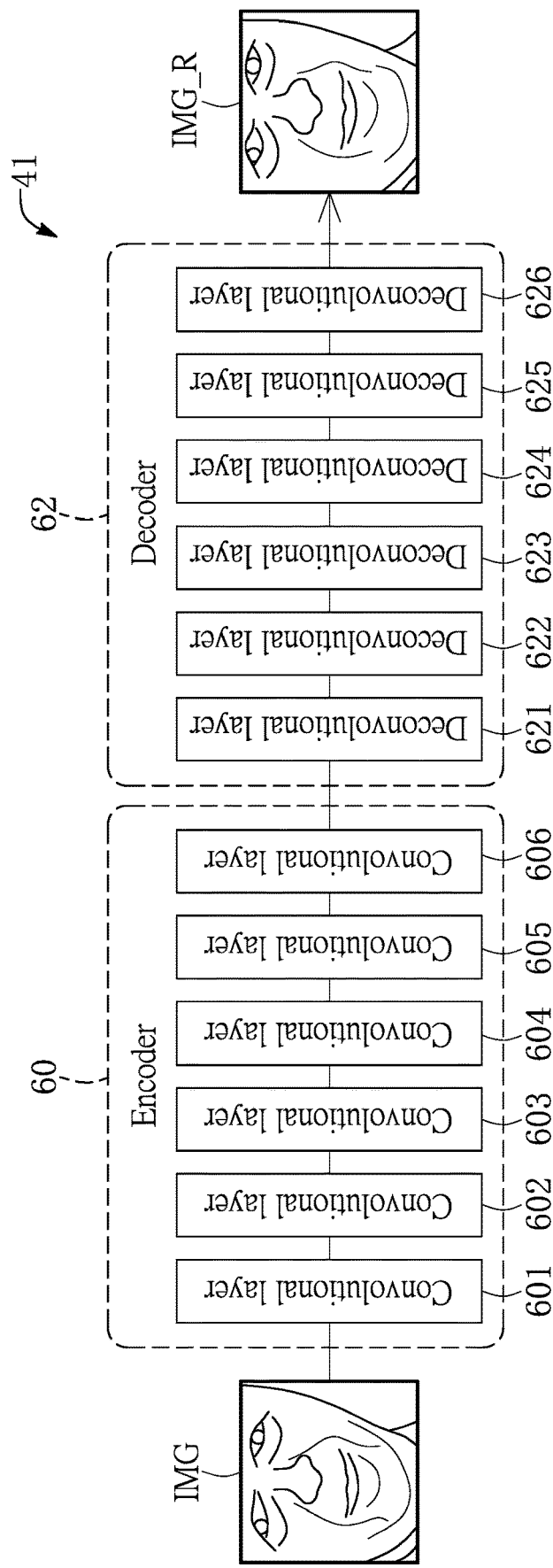
FIG. 6 is a schematic view of a network architecture of a restoration module according to the first embodiment of the present disclosure.

FIG. 6 is a schematic view of a network architecture of a restoration module 42 according to the first embodiment of the present disclosure. The restoration module 42 can be a deep convolutional neural network having an encoder-decoder structure and includes an encoder 60 and a decoder 62. The encoder 60 has convolutional layers 601 to 606. The decoder 62 has deconvolutional layers 621 to 626. The adoption of the encoder-decoder structure in the present disclosure is based on two considerations. First, a skip connection can be used to improve performance of the deep convolutional neural network that has a pixel-wise correspondence between the input image and the output image, such as the deep convolutional neural network of image segmentation. Since the input image IMG (e.g., the fisheye image) and the restored image IMG_R (e.g., the rectilinear image) of the restoration module 42 of the present disclosure have different geometric structures, there is no pixel-to-pixel correspondence between them and they are not applicable to the skip connection. Second, an operation of a down-sampling in the encoder-decoder structure reduces an image resolution and accordingly, parameters in the deep convolutional neural network can be reduced, thereby improving the performance of the restoration module 42. Further, a max-pooling method of the convolutional operation which extracts a maximum value from a convolution kernel (also known as a filter window) can reduce the image resolution, but it also causes a loss of positional information. In addition, the max-pooling method performs better for object classification in a three-dimensional spatial structure but is not suitable for object rectification in a two-dimensional planar structure. In contrast, in the present disclosure, the convolution with a stride is used instead of the max-pooling for the down-sampling, so that the loss of the positional information can be avoided. In addition, the convolution with the stride suits the encoder-decoder structure because it is an invertible operation.

Table 2 shows a network architecture of the encoder 60.

TABLE 2

| | | Encoder | | |
|---|---|---|---|---|
| Layer | Input size | Output size | Kernel size, Stride size | Quantity of Parameters |
| Convolutional layer 601 | 96 × 96 × 3 | 32 × 32 × 32 | 3 × 3 × 32, 3 | 0.8K |
| Batch normalization layer | 32 × 32 × 32 | 32 × 32 × 32 | | 0.1K |
| Convolutional layer 602 | 32 × 32 × 32 | 16 × 16 × 64 | 3 × 3 × 64, 2 | 18K |
| Batch normalization layer | 16 × 16 × 64 | 16 × 16 × 64 | | 0.2K |
| Convolutional layer 603 | 16 × 16 × 64 | 8 × 8 × 128 | 3 × 3 × 128, 2 | 73K |
| Batch normalization layer | 8 × 8 × 128 | 8 × 8 × 128 | | 0.5K |
| Convolutional layer 604 | 8 × 8 × 128 | 4 × 4 × 256 | 3 × 3 × 256, 2 | 300K |
| Batch normalization layer | 4 × 4 × 256 | 4 × 4 × 256 | | 1K |
| Convolutional layer 605 | 4 × 4 × 256 | 2 × 2 × 512 | 3 × 3 × 512, 2 | 1.2M |
| Batch normalization layer | 2 × 2 × 512 | 2 × 2 × 512 | | 2K |
| Convolutional layer 606 | 2 × 2 × 512 | 1 × 1 × 1024 | 3 × 3 × 1024, 2 | 4.7M |
| Total | | | | 12M |

The size of input, output, and kernel is denoted by rows × columns × quantity of filters.

Table 3 shows a network architecture of the decoder 62.

TABLE 3

Decoder

| Layer | Input size | Output size | Kernel size, Stride size | Quantity of Parameters |
|---|---|---|---|---|
| Deconvolutional layer 621 | 1 × 1 × 1024 | 2 × 2 × 512 | 3 × 3 × 512, 2 | 0.8K |
| Batch normalization layer | 2 × 2 × 512 | 2 × 2 × 512 | | 0.1K |
| Deconvolutional layer 622 | 2 × 2 × 512 | 4 × 4 × 256 | 3 × 3 × 256, 2 | 18K |
| Batch normalization layer | 4 × 4 × 256 | 4 × 4 × 256 | | 0.2K |
| Deconvolutional layer 623 | 4 × 4 × 256 | 8 × 8 × 128 | 3 × 3 × 128, 2 | 73K |
| Batch normalization layer | 8 × 8 × 128 | 8 × 8 × 128 | | 0.5K |
| Deconvolutional layer 624 | 8 × 8 × 128 | 16 × 16 × 64 | 3 × 3 × 64, 2 | 300K |
| Batch normalization layer | 16 × 16 × 64 | 16 × 16 × 64 | | 1K |
| Deconvolutional layer 625 | 16 × 16 × 64 | 32 × 32 × 32 | 3 × 3 × 32, 2 | 1.2M |
| Batch normalization layer | 32 × 32 × 32 | 32 × 32 × 32 | | 2K |
| Deconvolutional layer 626 | 32 × 32 × 32 | 96 × 96 × 3 | 3 × 3 × 3, 3 | 4.7M |
| Total | | | | 12M |

The size of input, output, and kernel is denoted by rows × columns × quantity of filters.

In one embodiment, the encoder 60 includes a plurality of convolutional layers 601 to 606 and a plurality of batch normalization layers, and one of the plurality of batch normalization layers is connected in series between two of the plurality of convolutional layers 601 to 606. The decoder 62 includes a plurality of deconvolutional layers 621 to 626 and a plurality of batch normalization layers, and one of the plurality of batch normalization layers is connected in series between two of the plurality of deconvolutional layers 621 to 626. In one embodiment, the encoder 60 further includes a plurality of rectified linear units (ReLUs) that are in an element-wise manner, and one of the plurality of ReLUs is connected in series between one of the plurality of batch normalization layers and one of the plurality of convolutional layers 601 to 605. The decoder 62 further includes a plurality of ReLUs, and one of the plurality of ReLUs is connected in series between one of the plurality of batch normalization layers and one of the plurality of deconvolutional layers 621 to 625. In other words, in addition to the convolutional layer 606 of the encoder 60 and the deconvolutional layer 626 of the decoder 62, each of an output terminal of a remaining of the convolutional layers and a remaining of the deconvolutional layers is connected to the batch normalization layer and the ReLU.

Figure 7:
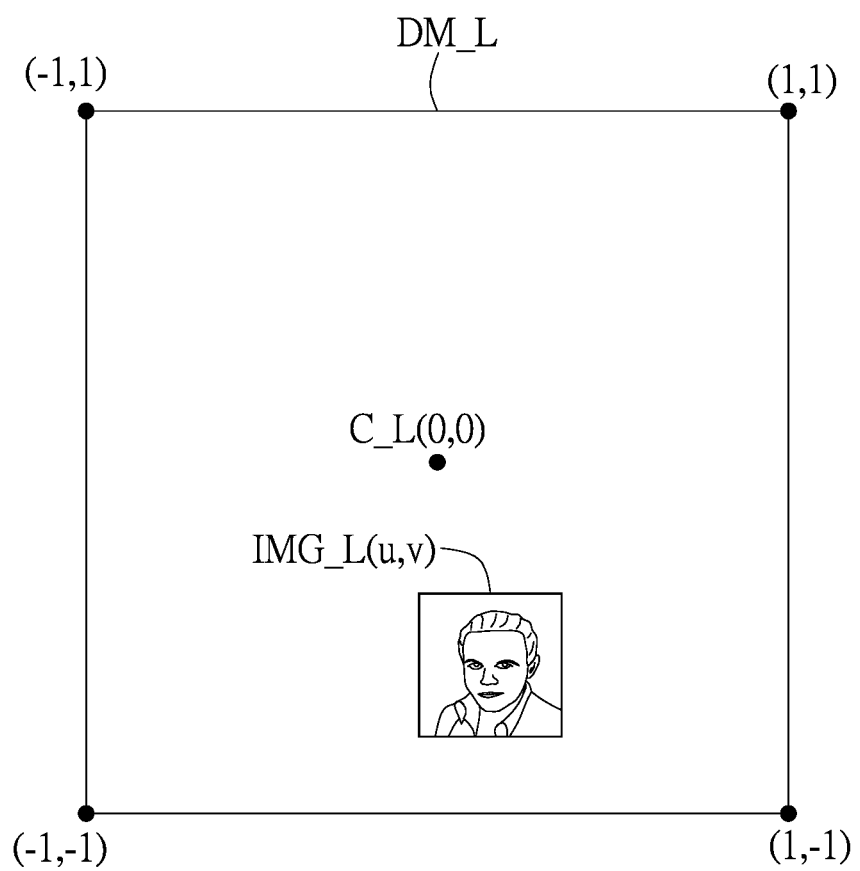
FIG. 7 is a schematic view of a rectilinear coordinate system according to the first embodiment of the present disclosure.
Figure 8:
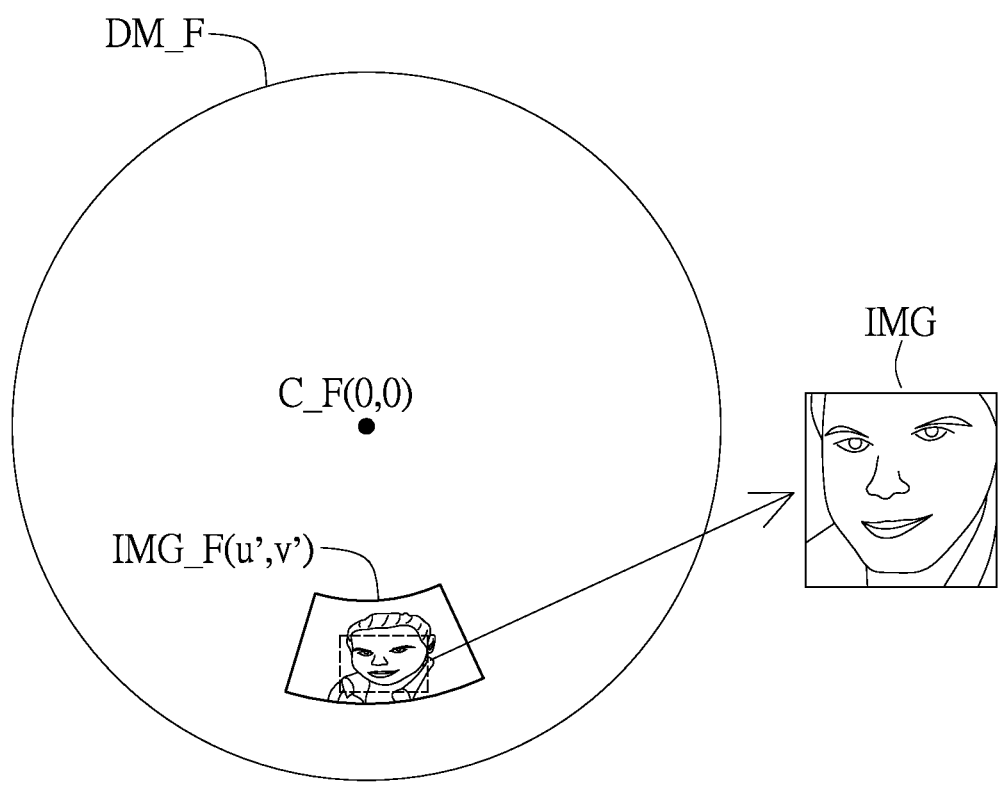
FIG. 8 is a schematic view of a fisheye coordinate system according to the first embodiment of the present disclosure.

With respect to a training of the face recognition system 4, the rectilinear image is transformed to the fisheye image, and then the fisheye image is inputted into the face recognition system 4, so as to train weights of each layer in a neural model. With reference to FIG. 7 and FIG. 8, the formation of the fisheye image is shown. FIG. 7 is a schematic view of a rectilinear coordinate system DM_L according to the first embodiment of the present disclosure, and FIG. 8 is a schematic view of a fisheye coordinate system DM_F according to the first embodiment of the present disclosure. In FIG. 7, a center of the rectilinear coordinate system DM_L is represented as C_L, and any pixel coordinates of a rectilinear image IMG_L in the rectilinear coordinate system DM_L are represented as (u, v). In FIG. 8, a center of the fisheye coordinate system DM_F is represented as C_F, and any pixel coordinates of a fisheye image IMG_F in the fisheye coordinate system DM_F are represented as (u', v'). Given the pixel coordinates (u, v) of the rectilinear image IMG_L, the corresponding pixel coordinates (u', v') of the fisheye image IMG_F can be expressed by the following equation (3).

$$(u', v') = \left( u\sqrt{1 - \frac{v^2}{2}} e^{-\frac{r^2}{2}}, v\sqrt{1 - \frac{u^2}{2}} e^{-\frac{r^2}{2}} \right). \quad (3)$$

The radial distance r between the pixel coordinates (u, v) and the center C_L of the rectilinear system is equal to $\sqrt{u^2+v^2}$. A coordinate transformation according to Equation (3) represents a barrel distortion property of the fisheye image, that is, the degree of distortion of the fisheye image increases towards a periphery of the fisheye coordinate system DM_F. For example, according to Equation (3), the pixel coordinates (u', v') of the fisheye image IMG_F decrease with a factor $$e^{\frac{r^2}{2}}$$

when the radial distance r increases.

After the coordinate transformation is completed, a face area from the fisheye image IMG_F is cropped to the input image IMG for the training of the face recognition system 4. Accordingly, in the present disclosure, a plurality of rectilinear images IMG_L evenly distributed in the rectilinear coordinate system DM_L can be obtained from a face database and each of the plurality of rectilinear images IMG_L can be used to perform the coordinate transformation to generate a plurality of fisheye images IMG_F evenly distributed in the normalized radial distance range, so that the face recognition system 4 can perform the face recognition on the fisheye image IMG_F corresponding to any one of the normalized radial distance.

Figure 9:
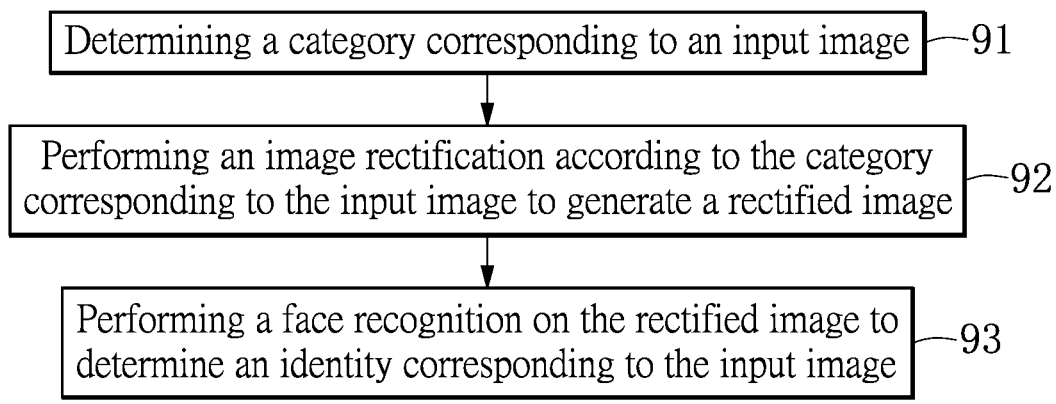
FIG. 9 is a flowchart of a face recognition process according to the first embodiment of the present disclosure.

The operation of the face recognition system 4 can be summarized as a face recognition process, as shown in FIG. 9. The face recognition process in FIG. 9 can be compiled into a code that is stored in a memory of an electronic device to instruct a processor of the electronic device to perform the following steps.

Step 91: determining the category corresponding to the input image.

Step 92: performing the image rectification according to the category corresponding to the input image, so as to generate the restored image.

Step 93: performing the face recognition on the restored image, so as to determine the identity corresponding to the input image.

In the face recognition process of FIG. 9, Step 91 can be performed by the classification module 41, Step 92 can be performed by the restoration module 42, and Step 93 can be performed by the feature extraction module 43 as well as the feature matching module 44. According to exemplary examples of FIG. 7 and FIG. 8, the face recognition process of FIG. 9 can also include a step for training a face recognition model before performing Step 91. The step for training the face recognition model includes: transforming the rectilinear image to the fisheye image, and then inputting the fisheye image into the face recognition model for a model training.

In summary, the face recognition system 4 of the present disclosure determines the category of the input image IMG, performs the image rectification on the input image IMG of a specific category to generate the restored image IMG_R, and then performs the face recognition on the restored image IMG_R, so that the accuracy of the face recognition of the fisheye image (or the distorted image) can be improved.

Beneficial Effects of the Embodiment

In conclusion, by virtue of "determining the category corresponding to the input image, performing the image rectification according to the category of the input image to generate the restored image, and performing the face recognition on the restored image to determine the identity corresponding to the input image", the accuracy of the face recognition of the fisheye image is improved by the method and the system of the deep face recognition provided by the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A deep face recognition method for a fisheye image, comprising:
    obtaining a fisheye image by a single fisheye camera;
    cropping the fisheye image to obtain an input image;
    determining a category corresponding to the input image, wherein the category correlates to a normalized radial distance corresponding to the input image;
    performing an image rectification according to the category corresponding to the input image to generate a restored image; and
    performing a face recognition on the restored image to determine an identity corresponding to the input image;
    wherein the input image is a cropped face image of the fisheye image.

2. The deep face recognition method according to claim 1, wherein the step of performing the image rectification according to the category corresponding to the input image includes:
    not performing an image processing on the input image when the normalized radial distance of the input image is in a first zone; and
    performing the image rectification on the input image when the normalized radial distance of the input image is in a second zone;
    wherein accuracy of a face recognition of the input image with the normalized radial distance in the first zone is greater than accuracy of a face recognition of the input image with the normalized radial distance in the second zone.

3. The deep face recognition method according to claim 2, wherein the step of performing the image rectification according to the category corresponding to the input image further includes:
    performing a first image rectification on the input image when the normalized radial distance of the input image is in the second zone; and
    performing a second image rectification on the input image when the normalized radial distance of the input image is in a third zone;
    wherein the accuracy of the face recognition of the input image with the normalized radial distance in the second zone is greater than accuracy of a face recognition of the input image with the normalized radial distance in the third zone.

4. A deep face recognition system for a fisheye image, comprising:
    a single fisheye camera being used to obtain a fisheye image, wherein the fisheye image is cropped to form an input image;
    a classification module being used to classify the input image and determine a category corresponding to the input image to generate a classification signal, wherein the category correlates to a normalized radial distance corresponding to the input image;
    a restoration module coupled to the classification module, the restoration module being used to restore the input image according to the classification signal to generate a restored image;
    a feature extraction module coupled to the restoration module, the feature extraction module being used to extract a feature of the restored image; and
    a feature matching module coupled to the feature extraction module, the feature matching module being used to determine an identity corresponding to the input image according to the feature;
    wherein the input image is a cropped face image of the fisheye image.

5. The deep face recognition system according to claim 4, wherein the restoration module includes:
    a follower;
    a first restoration unit being used to perform an image rectification on the input image to generate the restored image;
    a first switch coupled between the classification module, the follower, and the first restoration unit, the first switch being used to connect the input image to one of the follower and the first restoration unit corresponding to the category, according to the category indicated by the classification signal; and
    a second switch coupled between the follower, the feature extraction module, and the first restoration unit, the second switch being used to connect the restored image generated by one of the follower and the first restoration unit to the feature extraction module, according to the category indicated by the classification signal.

6. The deep face recognition system according to claim 5, wherein:
when the normalized radial distance of the input image is in a first zone, the follower does not perform the image rectification on the input image; and
when the normalized radial distance of the input image is in a second zone, the first restoration unit performs a first image rectification on the input image;
wherein accuracy of a face recognition of the input image with the normalized radial distance in the first zone is greater than accuracy of a face recognition of the input image with the normalized radial distance in the second zone.

7. The deep face recognition system according to claim 6, wherein the first restoration unit is used to perform the first image rectification on the input image, the restoration module further includes:
a second restoration unit coupled between the first switch and the second switch, the second restoration unit being used to perform a second image rectification on the input image to generate the restored image;
wherein, when the normalized radial distance of the input image is in the second zone, the first restoration unit performs the first image rectification on the input image, and when the normalized radial distance of the input image is in a third zone, the second restoration unit performs the second image rectification on the input image;
wherein the accuracy of the face recognition of the input image with the normalized radial distance in the second zone is greater than accuracy of a face recognition of the input image with the normalized radial distance in the third zone.

8. The deep face recognition system according to claim 4, wherein the classification signal is a 1-by-N one-hot vector, where N is a number of the category.

9. The deep face recognition system according to claim 4, wherein the restoration module includes a deep convolutional neural network having an encoder-decoder structure, the restoration module including:
an encoder including a plurality of convolutional layers and a plurality of first batch normalization layers, one of the plurality of first batch normalization layers being connected in series between two of the plurality of convolutional layers; and
a decoder coupled to the encoder, the decoder including a plurality of deconvolutional layers and a plurality of second batch normalization layers, and one of the plurality of second batch normalization layers being connected in series between two of the plurality of deconvolutional layers.

10. The deep face recognition system according to claim 9, wherein:
the encoder further includes a plurality of first rectified linear units, and except for a last one of the plurality of convolutional layers, one of the plurality of first rectified linear units is connected in series between one of the plurality of first batch normalization layers and one of the plurality of convolutional layers;
the decoder further includes a plurality of second rectified linear units, and except for a last one of the plurality of deconvolutional layers, one of the plurality of second rectified linear units is connected in series between one of the plurality of second batch normalization layers and one of the plurality of deconvolutional layers.

* * * * *